No. 803,196. PATENTED OCT. 31, 1905.
A. SHEARMAN.
STAND FOR HOLDING BICYCLES, WHEELS, AND THE LIKE.
APPLICATION FILED MAR. 29, 1904.

Witnesses.

Inventor.
Arthur Shearman
by C. S. Riches
his attorney

UNITED STATES PATENT OFFICE.

ARTHUR SHEARMAN, OF BIRMINGHAM, ENGLAND.

STAND FOR HOLDING BICYCLES, WHEELS, AND THE LIKE.

No. 803,196.     Specification of Letters Patent.     Patented Oct. 31, 1905.

Application filed March 29, 1904. Serial No. 200,660.

*To all whom it may concern:*

Be it known that I, ARTHUR SHEARMAN, cycle-maker, a subject of the King of Great Britain, and a resident of 53$^B$ Suffolk street, Birmingham, in the county of Warwick, England, have invented a certain new and useful Improved Stand for Holding Bicycles, Wheels, and the Like, (for which I have obtained a patent in Great Britain, Patent No. 7,825, dated the 4th day of April, 1903,) of which the following is a specification.

A stand being hinged in the center to take various-size wheels and having wheels or rollers fastened to the arms or base, whereby the bicycle and stand may be wheeled about.

The stand may be made of wrought or cast iron, brass, wood, or any suitable metal or material. The stand is made up with two sides, which grip the rim, each side being hinged in the center A, Figures 1, 2, 3, and following the circumference for about one-sixth of the wheel.

Figure 1:
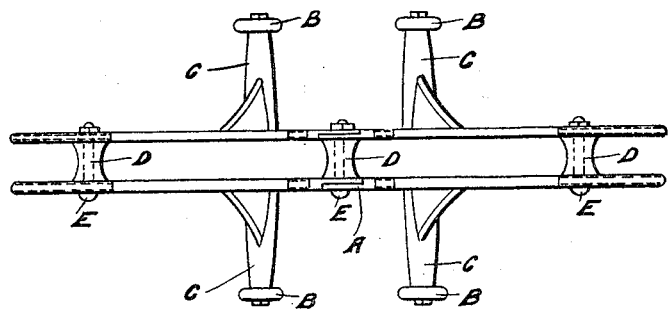

Between the extreme ends of the stand and the center of the joint or hinge A, Fig. 1, four arms C C C C, Fig. 1, are carried at right angles to the frame and which are sufficiently long to prevent the bicycle or wheel falling sidewise. To the ends of these arms or projections a wheel or roller B of any suitable metal or material is fixed, while for the purpose of keeping the two sides of the stand sufficiently wide enough apart to enable the tire and rim to pass between the rollers or reels D, Fig. 1, are fixed, one in the center at the hinged joint A and one on each end of the frame, as aforementioned, a bolt E, Fig. 1, passing through the frame and roller and being fastened with a nut on the other side, so as to hold the whole together.

Figure 2:
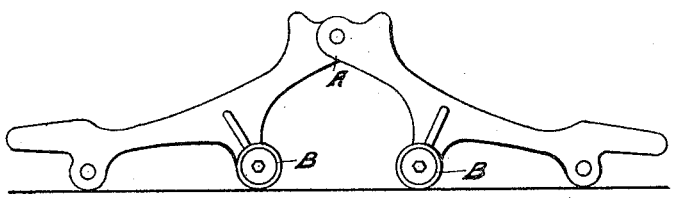

By the construction of the hinged joint A in the center the two rollers lie on the ground, as illustrated in Fig. 2, and the center roller is raised well above the ground.

Figure 3:
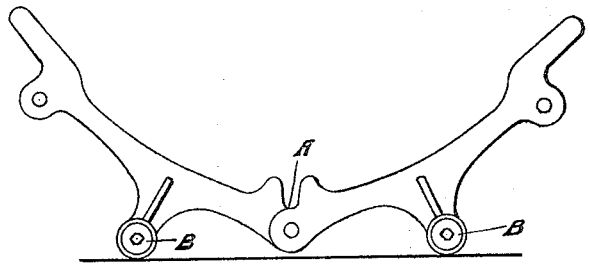

When the bicycle is wheeled onto either of the end rollers D and pushed forward to the center roller D, the weight of the bicycle or wheel forces the center roller downward, as illustrated by Fig. 3, causing the two end rollers to rise and clip the wheel front and back and transferring the whole weight of the wheel and stand to the four wheels or rollers B, upon which the whole is then free to travel.

Having now described my invention, what I claim as new, and desire to secure by Letters Patent, is—

1. In a bicycle-stand the combination of two supporting members each consisting of two parallel side bars and spacing means interposed between the side bars, means for articulatingly uniting the adjacent ends of the supporting members, laterally-disposed arms projecting from the opposite sides of the supporting members and rollers rotatably mounted on said arms.

2. In a bicycle-stand the combination of two supporting members each consisting of two parallel side bars, spacing-rollers interposed between the side bars to position them and bolts passing through the side bars and rollers to hold them together, means for articulatingly uniting the adjacent ends of the supporting members, laterally-disposed arms projecting from the opposite sides of the supporting members and rollers rotatably mounted on said arms.

In witness whereof I have hereunto set my hand in the presence of two witnesses.

ARTHUR SHEARMAN.

Witnesses:
WALTER H. WYARTLAME,
FREDERICK A. P. CRUXTON.